United States Patent

[11] 3,545,528

[72] Inventor Yi Chung Chang
 Franklin Township, Westmoreland County, Pennsylvania
[21] Appl. No. 719,177
[22] Filed April 5, 1968
[45] Patented Dec. 8, 1970
[73] Assignee United States Steel Corporation
 a corporation of Delaware

[54] APPARATUS FOR DETERMINING TRAVEL TIME OF MOVING MATERIAL
 8 Claims, 1 Drawing Fig.
[52] U.S. Cl.................................................. 164/154,
 324/68, 235/151.32, 346/33, 164/282, 164/283
[51] Int. Cl........................................................B22c 19/04,
 G04f 9/00
[50] Field of Search.......................................... 324/68(B),
 70(F); 235/151.32, 61.11, 92—29(D), 151.1,
 151.11, 61(E); 346/33(speed); 164/154

[56] References Cited
 UNITED STATES PATENTS
1,971,238 8/1934 Silling........................... 235/151.32

Primary Examiner—Alfred E. Smith
Attorney—Martin J. Carroll

ABSTRACT: A writing head using electrically conductive ink is moved laterally across a uniformly moving chart paper a distance proportional to the distance a steel slab moves from a casting mold to a cooling station thereby drawing a time-distance curve. A reading head consisting of a coil of resistance wire connected across a voltage source is adapted to contact the chart paper and is spaced away from the writing head a distance representing the spacing from the mold to the cooling station. When the reading head contacts the curve, the writing head acts as a voltage divider and provides a voltage signal proportional to the time required for the slab to travel the distance from the mold to the cooling station. Preferably a pair of such devices operate alternately to provide a continuous voltage signal controlling the flow of cooling water.

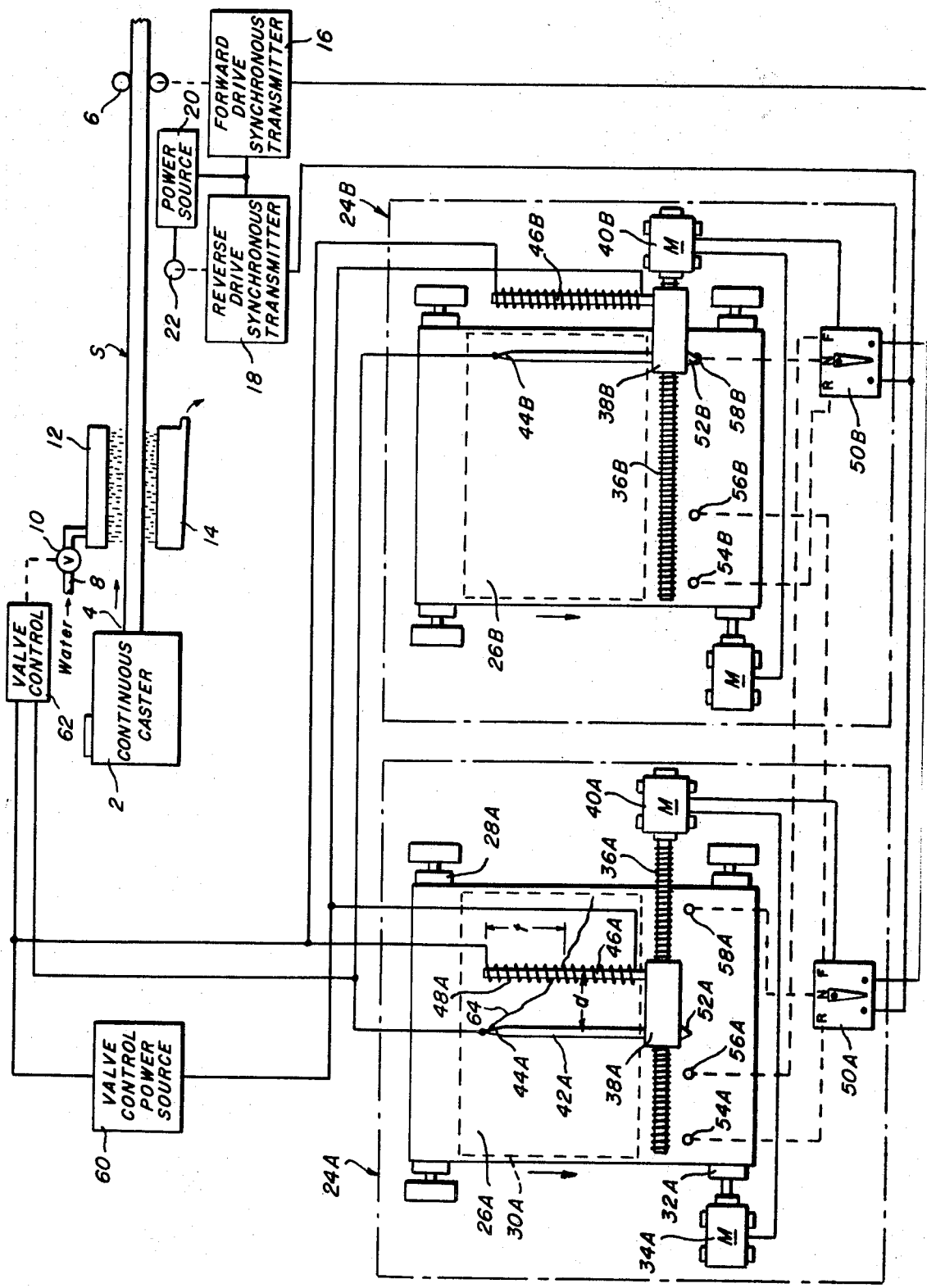

APPARATUS FOR DETERMINING TRAVEL TIME OF MOVING MATERIAL

This invention relates to apparatus for determining the time required for a segment of elongated material to travel between two locations.

In some process lines that operate at variable speeds it is desirable to provide controls dependent on the time required for a segment of elongated material to move from a first location to a second location. For example, in quenching a continuously cast steel slab the flow rate of the cooling water is a function of the time required for a slab segment to travel from the mold to the cooling station.

Digital computer systems have been used to control the cooling water in a continuous casting line, but these are operated on length increments, changing the flow once for each foot of slab travel. An analogue system would be more accurate and provide continuous control of the water flow.

According to my invention a time-distance chart is prepared by plotting elapsed clock time for the length of slab produced. A line is drawn on a longitudinally moving chart paper by a writing head moved laterally by a connection to the slab pinch rolls. By sensing the longitudinal difference between the writing head position and the position of a line a lateral distance away from the writing head equivalent to the distance from the mold to the cooling station, the travel time for any particular segment of slab to reach the cooling station is continuously determined.

It is therefore an object of my invention to provide apparatus for determining the travel time of a segment of elongated material between two locations.

Another object is to provide such an apparatus where the speed of the elongated material is variable.

A still further object is to provide apparatus which develops an electrical signal proportional to the travel time of segment of elongated material between two locations.

Still another object of my invention is to provide an apparatus that continuously determines the travel time of elongated material between the two locations.

These and other object will be more apparent after referring to the following specification and attached drawing, in which:

The single FIG. is a schematic view of the apparatus of my invention.

Referring now to the drawing, reference numeral 2 represents a mold of a continuous casting machine (not shown) casting a steel slab S. The slab S leaves the mold at point 4 and is driven by pinch rolls 6. Cooling water 8 passes through a control valve 10 to a cooling spray head 12 and over the hot slab S to a drain 14. This is conventional apparatus used in continuous casting.

A forward drive synchronous transmitter 16 is mechanically connected to pinch roll 6 which drives it at a speed proportional to slab speed. A reverse drive synchronous transmitter 18 is mechanically connected to a reverse drive motor 22. Transmitters 16 and 18 and motor 22 are connected to a suitable single phase alternating current driving power source 20. The transmitters 16 and 18 are those used in Selsyn devices manufactured by the General Electric Company, Type 3S9890, Model GEH2129A. Transmitters 16 and 18 are connected to two identical curve followers 24A and 24B such as a Brown Curve Follower Model S153-19a manufactured by Minneapolis Honeywell Regulator Company, Brown Instrument Division, Philadelphia, Pennsylvania, modified as hereinafter described. Corresponding components of the curve followers are identified by A or B subscripts to reference numerals.

The curve follower 24A includes a chart paper 26A paid off from a roll 28A across a flat writing surface 30A and wound up into a roll 32A by a motor 34A. A guide rail 36A is located perpendicular to the direction of chart travel adjacent the chart paper 26A and roll 32A. A carriage 38A is movable back and forth along guide rail 36A by synchronous receiver 40A such as is used in Selsyn devices already described. Synchronous receiver 40A drives carriage 38A in any conventional manner such as by a gear and chain drive or a screw drive. Receiver 40A is also electrically connected to motor 34A.

Projecting from one end of carriage 38A is a writing head 42A tipped by a pen 44A adapted to write with electrically conductive ink on the chart paper 26A on forward carriage movement (right to left) and to lift off the chart paper 26A on reverse carriage movement (left to right). Also projecting from carriage 38A is a reading head 46A a fixed distance $d$ from the writing head 42A and parallel to it. Reading head 46A has a spirally wound resistance wire 48A adapted to make rolling contact on the chart papers 26A. Writing head 42A and reading head 46A are electrically insulated from each other.

Synchronous receiver 40A is connected to Selsyn transmitters 16 and 18 through a three position switch 50A. A projection 52A on carriage 38A is adapted to operate against actuators 54A, 56A and 58A to mechanically actuate switch 50A. Resistance coil 48A of the reading head 46A is connected across a valve controller power source 60. One terminal of the valve controller power source is connected to one terminal of a valve controller 62 and the other terminal of valve controller 62 is connected to pens 44A and 44B.

When the continuous castor is in operation, pinch rolls 6 drive the slab S at various speeds. The rotations of the pinch rolls 6 are picked up by the synchronous transmitter 16 and a synchronizing signal sent to the three position switches 50A and 50B. Assume that switch 50A is in the F position where the forward direction synchronous transmitter 16 drives synchronous receiver 40A to move carriage 38A to the left and switch 50B is in the N position where synchronous receiver 40B is disconnected from the synchronous transmitters and carriage 38B is at rest in the extreme right position with pen 44B lifted off chart paper 26B and the chart paper 26B is at rest. When synchronous receiver 40A begins to move carriage 38A from its extreme right position motor 34A begins operating at a predetermined constant speed. The combination of the chart 26B moving at a predetermined constant speed and the carriage moving at a speed varied as the pinch roll speeds vary results in drawing a time-distance curve 64. When carriage 38A moves a distance $d$, reading head 46A comes in contact with curve 64. Writing head 44A then functions as a voltage divider impressing on the valve controller 62 that portion of the voltage of the valve controller power source 60 which is across the resistance winding 48A between the tip of the reading head and the point where curve 64 contacts the resistance wire 48A. Thus, with proper selection of scales and chart speeds, with carriage speeds varying as pinch roll speeds, and with distance $d$ proportional to the distance from point 4 to cooling station 12, the distance $t$ continuously represents the time required for the slab to travel from point 4 to cooling station 12. Since the chart paper is moving at a speed proportional to clock time, the voltage applied to the valve controller 62 is proportional to clock time and the voltage may be used to indicate the travel time in any convenient manner. Here, the voltage is used to operate valve controller 62, which in turn controls valve 10 and changes the amount of cooling water sprayed on the slab S according to the travel time of the slab.

By using the two curve followers 24A and 24B a continuous signal is provided to the valve controller 62. Carriage 38A continues to move toward the left until prong 52A contacts actuator 56A which moves switch 50B to the F position. Both carriages 38A and 38B then move in the forward direction under the control of the forward synchronous transmitter 16. When prong 52A contacts actuator 54A switch 50A is moved to the R position. Reverse synchronous transmitter 18 then drives synchronous receiver 40A in the reverse direction moving carriage 38A to the right, lifting pen 44A from the chart 26A and stopping chart drive motor 34A. Reverse direction motor 22 drives synchronous transmitter 18 fast enough to require substantially less time for full carriage travel in the reverse direction than the expected time for full carriage travel in the forward direction. When prong 52A contacts actuator 58A switch 50A is moved to the N or neutral position disconnecting synchronous receiver 40A from either synchronous transmitter 16 or 18. After carriage 38B has moved a distance $d$ the reading head 46B will contact the curve drawn by pen 44B and begin to produce a voltage signal to valve controller 62 at the same time that carriage 38A has arrived at the extreme left position and stops producing a signal with the lifting of the pen 44A at actuator 54A position. When prong 52B of carriage 38B contacts actuator 56B carriage 38A will begin to move forward and will then again supply the voltage signal after moving a distance $d$.

While the preferred embodiment of my invention is illustrated with a writing head using conductive ink and a rolling contact curve follower it is obvious that other devices capable of receiving and retaining intelligence may be used to plot and follow the time-distance curve 64. Such devices may use a thermal pen and heat sensitive paper, or light or radiation sensitive paper with sensitizing devices for writing and reading, or magnetic tape and sensitizing devices. The magnetic tape could be an endless belt with an erasing head at a suitable location.

While one embodiment of my invention has been shown and described, it will be apparent that other adaptations and modifications may be made without departing from the scope of the following claims.

I claim:

1. Apparatus for determining the time required for segment of elongated material to move a fixed distance comprising means for providing a first signal proportional to the movement of said elongated material, means responsive to said first signal for providing a time-distance curve of the movement of said elongated material, and means connected to said second named means for concurrently generating a second signal related to the elapsed time shown on said time-distance curve for the fixed distance.

2. Apparatus according to claim 1 in which the means for providing a time-distance curve includes a surface capable of receiving and retaining intelligence, writing means for placing on said surface a curve having time on a first axis and distance said elongated material has moved on a second axis intersecting said first axis and in which said means for concurrently generating a second signal includes means for reading from said curve a distance along said first axis corresponding to said fixed distance represented along said second axis.

3. Apparatus according to claim 2 including a first and a second edge of said surface, means for moving said moving writing means and said reading means from said first edge to said second edge while providing said curve, means for disabling said writing means and said reading means when said writing means reaches said second edge, means for moving said disabled writing means and said disabled reading means from said second edge to said first edge, and means for enabling said writing head and said reading head upon reaching said first edge.

4. Apparatus according to claim 3 which includes a second writing means, a second reading means associated with said second writing means connected to said connecting means, and means for enabling one writing means and its associated reading means while the other writing means and its associated reading means is disabled thereby providing a continuous signal related to the elapsed time.

5. Apparatus according to claim 2 including a second curve providing means, a second means for concurrently a signal related to the elapsed time associated with said second curve providing means, a first and a second edge of each of said surfaces, means connected to said writing means for enabling one of said writing means and its associated reading means as the other of said writing means approaches said first edge of said other surface, means connected to said writing means for disabling said other writing means and its associated reading means when said other writing means reaches said first edge of said other surface, means connected to said writing means for moving said other reading means and said other writing means to said second edge of said other surface thereby providing a continuous signal related to the elapsed time.

6. Apparatus according to claim 2 in which the means for providing a curve includes a flat electrically insulated writing surface, means for moving said writing surface in the plane of said surface in a given direction at a uniform speed, a carriage adapted to move across said flat writing surface on a path perpendicular to the direction of movement of said flat writing surface and in a plane parallel to said flat writing surface, means responsive to said first signal for moving said carriage along said path a distance proportional to the distance said elongated material moves in said fixed distance, and means mounted on said carriage for writing an electrically conductive curve on said writing surface as said flat writing surface and said carriage both move; and in which said means for concurrently generating a signal related to the elapsed time includes a voltage source, and reading means mounted on said carriage spaced away from said writing means a distance proportional to said fixed distance, said reading means including a bar of electrical insulating material with its longitudinal axis parallel to the direction of movement of said flat writing surface spirally wound with a length of resistance wire connected across said voltage source and adapted to contact said flat writing surface whereby when said resistance wire contacts a said curve said writing means functions as a voltage divider to provide a voltage signal proportional to the time required for a segment of said elongated material to move said fixed distance.

7. Apparatus according to claim 6 including a second means for providing a curve, a second reading means connected to said voltage source and associated with said second curve providing means, a first and a second edge of each of said surfaces, means connected to one of said carriages when said carriage approaches one of said edges of one of said surfaces for engaging said carriage moving means to said other carriage and to enable said writing means and said reading means of said other carriage, and means operable when said one carriage arrives as said one edge for disengaging said one carriage from said carriage moving means and disabling said writing means and said reading means of said one carriage and for returning said one carriage to the other edge of said flat writing surface whereby said voltage signal is continuously provided.

8. Apparatus according to claim 7 including a continuous casting machine for providing said elongated material, means adjacent said machine for spraying a cooling medium on said elongated material emerging from said machine, and means coupled to said voltage signal for controlling said cooling means.